(12) United States Patent
Hamilton, II et al.

(10) Patent No.: US 10,592,933 B2
(45) Date of Patent: Mar. 17, 2020

(54) MANAGING EPHEMERAL LOCATIONS IN A VIRTUAL UNIVERSE

(71) Applicant: INTERNATIONAL BUSINESS MACHINES CORPORATION, Armonk, NY (US)

(72) Inventors: Rick A. Hamilton, II, Charlottesville, VA (US); Brian M. O'Connell, Cary, NC (US); Clifford A. Pickover, Yorktown Heights, NY (US); Anne R. Sand, Canon City, CO (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 15/852,481

(22) Filed: Dec. 22, 2017

(65) Prior Publication Data
US 2018/0121967 A1    May 3, 2018

Related U.S. Application Data

(63) Continuation of application No. 15/716,574, filed on Sep. 27, 2017, now Pat. No. 9,940,648, which is a
(Continued)

(51) Int. Cl.
*G06F 3/048* (2013.01)
*G06Q 30/02* (2012.01)
(Continued)

(52) U.S. Cl.
CPC ..... *G06Q 30/0277* (2013.01); *G06F 3/04815* (2013.01); *G06Q 30/0273* (2013.01);
(Continued)

(58) Field of Classification Search
CPC .... G06F 3/0482; G06F 3/011; G06F 3/04815; G06F 3/04845; G06Q 30/02; G06Q 30/0601; G06Q 30/0241; G06Q 30/0603
See application file for complete search history.

(56) References Cited

U.S. PATENT DOCUMENTS 6,036,601 A    3/2000   Heckel
6,070,149 A    5/2000   Tavor et al.
(Continued)

OTHER PUBLICATIONS

Notice of Allowance in related U.S. Appl. No. 15/583,230 dated Nov. 17, 2017, 25 pages.
(Continued)

*Primary Examiner* — Nicholas Augustine
(74) *Attorney, Agent, or Firm* — Brian Restauro; Andrew M. Calderon; Roberts Mlotkowski Safran Cole & Calderon P.C.

(57) ABSTRACT

Systems and methods for advertising, and, more particularly, systems and methods for managing ephemeral locations in a virtual universe. A method for managing ephemeral locations in a virtual universe (VU) includes causing a computer infrastructure to: render an ephemeral location upon a triggering in the VU; teleport a VU user avatar to the ephemeral location; permit the user avatar to interact in the ephemeral location; teleport the user avatar out of the ephemeral location; and un-render the ephemeral location.

12 Claims, 4 Drawing Sheets

Related U.S. Application Data continuation of application No. 15/583,230, filed on May 1, 2017, now Pat. No. 9,928,528, which is a continuation of application No. 15/354,035, filed on Nov. 17, 2016, now Pat. No. 9,672,542, which is a continuation of application No. 14/990,316, filed on Jan. 7, 2016, now Pat. No. 9,547,413, which is a continuation of application No. 12/189,223, filed on Aug. 11, 2008, now Pat. No. 9,256,346.

(51) Int. Cl.
| | |
|---|---|
| G06F 3/0481 | (2013.01) |
| H04L 29/06 | (2006.01) |
| H04L 29/08 | (2006.01) |
| G06T 13/40 | (2011.01) |
| G06T 19/00 | (2011.01) |
| G06T 19/20 | (2011.01) |
| G06F 3/01 | (2006.01) |

(52) U.S. Cl.
CPC ............ *G06T 13/40* (2013.01); *G06T 19/003* (2013.01); *G06T 19/20* (2013.01); *H04L 65/403* (2013.01); *H04L 65/60* (2013.01); *H04L 67/10* (2013.01); *G06T 2219/024* (2013.01)

(56) References Cited

U.S. PATENT DOCUMENTS

| | | | |
|---|---|---|---|
| 6,118,456 A | 9/2000 | Cooper | |
| 6,256,043 B1 | 7/2001 | Aho et al. | |
| 6,271,843 B1* | 8/2001 | Lection | G06T 15/00 |
| | | | 434/62 |
| 6,329,986 B1 | 12/2001 | Cheng | |
| 6,362,817 B1* | 3/2002 | Powers | G06T 17/00 |
| | | | 345/419 |
| 6,396,509 B1 | 5/2002 | Cheng | |
| 6,738,065 B1 | 5/2004 | Even-Zohar | |
| 6,801,930 B1 | 10/2004 | Dionne et al. | |
| 6,845,486 B2 | 1/2005 | Yamada et al. | |
| 6,928,414 B1 | 8/2005 | Kim | |
| 6,954,728 B1 | 10/2005 | Kusumoto et al. | |
| 6,968,315 B1 | 11/2005 | Nakisa | |
| 6,981,220 B2 | 12/2005 | Matsuda | |
| 6,988,127 B2 | 1/2006 | Matsuda et al. | |
| 7,054,831 B2 | 5/2006 | Koenig | |
| 7,076,445 B1 | 7/2006 | Cartwright | |
| 7,146,576 B2 | 12/2006 | Chang et al. | |
| 7,184,047 B1 | 2/2007 | Crampton | |
| 7,210,104 B2 | 4/2007 | Nakagawa et al. | |
| 7,266,511 B2 | 9/2007 | Teshima | |
| 7,680,694 B2 | 3/2010 | Glazer et al. | |
| 7,788,323 B2* | 8/2010 | Greenstein | G06T 19/00 |
| | | | 709/204 |
| 7,817,150 B2* | 10/2010 | Reichard | G06T 19/00 |
| | | | 345/419 |
| 7,901,288 B2 | 3/2011 | Barsness et al. | |
| 8,046,408 B2 | 10/2011 | Torabi | |
| 9,111,285 B2 | 8/2015 | Amidon et al. | |
| 2001/0020955 A1 | 9/2001 | Nakagawa et al. | |
| 2002/0040327 A1 | 4/2002 | Owa | |
| 2002/0138607 A1 | 9/2002 | O'Rourke et al. | |
| 2003/0005439 A1 | 1/2003 | Rovira | |
| 2004/0030741 A1 | 2/2004 | Wolton et al. | |
| 2004/0064351 A1 | 4/2004 | Mikurak | |
| 2004/0143495 A1 | 7/2004 | Koenig | |
| 2004/0148221 A1 | 7/2004 | Chu | |
| 2004/0162759 A1 | 8/2004 | Willis | |
| 2004/0193441 A1 | 9/2004 | Altieri | |
| 2005/0030309 A1 | 2/2005 | Gettman et al. | |
| 2005/0086605 A1 | 4/2005 | Ferrer et al. | |
| 2005/0086612 A1 | 4/2005 | Gettman et al. | |
| 2006/0015904 A1 | 1/2006 | Marcus | |
| 2006/0111979 A1 | 5/2006 | Chu | |
| 2006/0143095 A1 | 6/2006 | Sandus et al. | |
| 2006/0178968 A1 | 8/2006 | Jung et al. | |
| 2006/0178975 A1 | 8/2006 | Jung et al. | |
| 2006/0287105 A1 | 12/2006 | Willis | |
| 2007/0061202 A1 | 3/2007 | Ellis et al. | |
| 2007/0061204 A1 | 3/2007 | Ellis et al. | |
| 2007/0101276 A1 | 5/2007 | Yuen | |
| 2007/0118394 A1 | 5/2007 | Cahoon | |
| 2007/0118420 A1 | 5/2007 | Jung et al. | |
| 2007/0129148 A1 | 6/2007 | Van Luchene | |
| 2007/0156509 A1 | 7/2007 | Jung et al. | |
| 2007/0179867 A1* | 8/2007 | Glazer | G06Q 30/0253 |
| | | | 705/26.43 |
| 2008/0134056 A1* | 6/2008 | Shuster | A63F 13/12 |
| | | | 715/757 |
| 2008/0204449 A1* | 8/2008 | Dawson | G06Q 30/02 |
| | | | 345/419 |
| 2008/0215975 A1* | 9/2008 | Harrison | A63F 13/10 |
| | | | 715/706 |
| 2008/0215994 A1* | 9/2008 | Harrison | A63F 13/10 |
| | | | 715/757 |
| 2008/0235320 A1* | 9/2008 | Joy | G06T 19/00 |
| | | | 709/201 |
| 2009/0063983 A1* | 3/2009 | Amidon | G06N 3/006 |
| | | | 715/733 |
| 2011/0078052 A1 | 3/2011 | Ciptawilangga | |

OTHER PUBLICATIONS

Notice of Allowance in related U.S. Appl. No. 15/716,574 dated Dec. 6, 2017, 10 pages.

* cited by examiner

MANAGING EPHEMERAL LOCATIONS IN A VIRTUAL UNIVERSE

FIELD OF THE INVENTION

The invention generally relates to systems and methods for advertising, and, more particularly, to systems and methods for managing ephemeral locations in a virtual universe.

BACKGROUND

The concept of a virtual universe (also called a virtual world or a metaverse) is rapidly becoming a popular part of today's culture. In general, a virtual universe (VU) is a digital world (e.g., a three-dimensional computer-generated landscape) in which a user controls an avatar (e.g., a graphical representation of the user in the VU) to interact with objects and other avatars within the VU. Examples of popular VUs include SECOND LIFE® (a registered trademark of Linden Research, Inc. in the United States, other countries, or both) and ACTIVEWORLDS® (a registered trademark of Activeworlds, Inc. in the United States, other countries, or both).

Generally, a host computing system stores data regarding the landscape, objects, and users of the VU. A client software program runs on each user computer. The client program communicates (e.g., through a network connection) with the host system, and provides a visual (and, sometimes, audible) representation of the VU on the user computer. As the user moves his or her avatar throughout the VU, the visual representation displayed on the user computer changes according to the avatar location in the VU. In this manner, a user may cause his or her avatar to approach other avatars and interact with the other avatars. For example, one avatar may approach and communicate with another avatar via VOIP (voice over IP) and/or text-based communication through the network.

Moreover, in some VUs, users may possess virtual money that is purchased with real money. For example, a user may allow a VU host to debit his or her credit card in exchange for virtual money. The user can then exchange this virtual money with other users of the virtual world for a wide range of items and/or services, such as, for example, objects (e.g., clothing for an avatar), access to private areas of the VU, etc.

Additionally, in some VUs, users may even own virtual real estate. For example, a user may pay the VU host, or another third party, real money for an area of virtual real estate in the VU. The user may then create objects on that real estate, such as a night club where music plays and other avatars are invited to congregate to socialize (e.g., chat, dance, etc.).

Moreover, real estate within a VU has a cost, both in terms of dollars and computing resources. Currently all real estate locations within a VU are built on a static grid. Once a location is created, it exists at all times, whether it is being used or not. The use of such static locations for advertising is both inefficient and costly.

SUMMARY

In a first aspect of the invention, there is a method for managing at least one ephemeral location in a virtual universe (VU). The method comprises causing a computer infrastructure to: render an ephemeral location upon a triggering in the VU; teleport a VU user avatar to the ephemeral location; permit the user avatar to interact in the ephemeral location; teleport the user avatar out of the ephemeral location; and un-render the ephemeral location.

In another aspect of the invention, there is a method for advertising in a virtual universe (VU). The method includes providing a computer infrastructure structured and arranged to: detect a trigger of a VU-ad by a user in a VU grid; render an ephemeral location in the VU; transport a user avatar from the VU grid to the ephemeral location; present the VU-ad to the user at the ephemeral location; transport the user avatar from the ephemeral location back to the VU grid; and un-render the ephemeral location.

In another aspect of the invention, a computer program product comprises a computer usable medium having a computer readable program embodied in the medium, wherein the computer readable program when executed on a computing device causes the computing device to: detect a trigger of a VU-ad by a user in a VU grid; render an ephemeral location in a VU; present the VU-ad to the user at the ephemeral location; and un-render the ephemeral location.

In another aspect of the invention, there is a system comprising hardware and software arranged to: render an ephemeral location upon a triggering in the VU; teleport a VU user avatar to the ephemeral location; permit the user avatar to interact in the ephemeral location; teleport the user avatar out of the ephemeral location; and un-render the ephemeral location.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
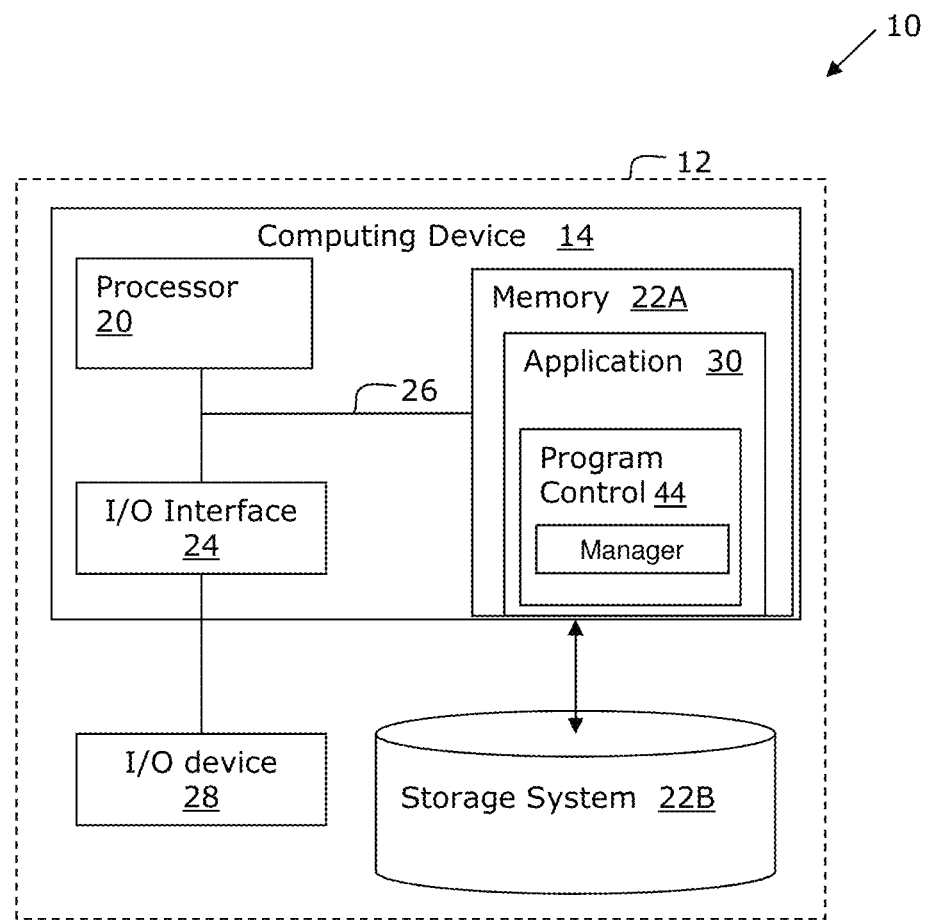
FIG. 1 shows an illustrative environment for implementing the steps in accordance with the invention.

The invention generally relates to systems and methods for advertising, and, more particularly, to systems and methods for managing ephemeral locations in a virtual universe. Exemplary embodiments of the invention provide for the creation and management of ephemeral locations (e.g., temporary areas that are rendered, used, and un-rendered) in a VU. Implementations of the invention provide the benefit of conserving VU land space and processing power. Although the invention is described with respect to ephemeral locations used with advertising in a VU, it is understood that the invention is not limited in this manner, and aspects of the invention can be used for the creation and management of ephemeral locations for any desired purpose.

Aspects of the invention involve the overall management of the use of ephemeral locations within a VU. An ephemeral location is not an ordinary static region of the VU. Instead, an ephemeral location is a temporary location in the VU that is rendered for a particular task or event (e.g., presenting an advertisement), and is un-rendered after completion of the task or event. For example, a user may initiate an advertisement by some trigger (e.g., menu option, touching a predefined object, moving over a pre-defined VU grid location). Once triggered, the user avatar is teleported to the newly rendered ephemeral location where the advertisement occurs. The user observes and/or interacts with the advertisement at the ephemeral location. Upon completion of the advertisement, the user avatar is teleported back to the original VU grid location (or, alternatively, to another VU grid location), and the ephemeral location is un-rendered.

As used herein, an ephemeral location may comprise a location that normally does not exist in the static grid of the VU, and is temporarily rendered for the purpose of presenting an advertisement or other use. Additionally or alternatively, an ephemeral location may comprise a location that exists in the static grid of the VU, but is temporarily commandeered for presenting an advertisement or other use. In the latter case, other users of the VU may be denied access to the location of the VU while the ephemeral location is rendered; however, these other users would be permitted access to the location after the ephemeral location is un-rendered. In both scenarios, the ephemeral location does not permanently occupy real estate in the VU.

Online virtual universes or environments present a tremendous new outlet for both structured and unstructured virtual collaboration, gaming and exploration, as well as real-life simulations in virtual spaces. These activities, along with yet to be disclosed new dimensions, in turn, provide a wide open arena for creative and new advertising methods and mechanisms. Immersive virtual universes, among other things, are an avenue to expose potential consumers to a company's advertising. With the astounding and continual increase in the number of users of virtual worlds, companies are taking more interest in reaching out to virtual world residents through advertising.

With the possibility of owning virtual real estate and creating objects on that real estate that other users can see and hear, it is not surprising that entities have begun advertising inside VUs. However, although advertising is ubiquitous in real life today, advertising is only beginning to be realized and utilized in VUs. Current methods of advertising in VUs are generally passive. For example, billboards having logos, brand names, animated commercials, etc., are often created and displayed in various spaces of the VU Like conventional television ads, such billboards provide a brief summary of a product or service. Similarly, some companies have created virtual showrooms in which likenesses of real-world products are displayed. However, such passive advertising is easily ignored and/or does not generate sufficient interest in many users, and thus often provides little value to the advertiser.

Moreover, with the growing popularity of collaborative (e.g., Web 2.0) services (e.g., blogs, wikis, etc.), there is a realization that consumers are no longer satisfied with passive entertainment and/or advertising in which information is merely thrust upon them. Instead, it is perceived that VUs, simulation games, and/or television may merge to form a hybrid interactive entertainment experience and commerce medium. In accordance with this, implementations of the invention provide a three dimensional, immersive, and interactive experience for advertising a product and/or service. As such, embodiments of the invention provide consumers with a more interactive and enjoyable experience, while also providing sellers enhanced advertising techniques beyond traditional television and other passive media.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes the computing device 14 operable to perform the processes described herein, such as, for example, managing ephemeral locations in a VU. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code (e.g., program control 44) in order to reduce the number of times code must be retrieved from bulk storage during execution. Further, the computing device 14 is in communication with an external I/O device/resource 28 and a storage system 22B. The I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

The processor 20 executes computer program code (e.g., program control 44), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, wireless notebook, smart phone, personal digital assistant, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein, such as, for example, managing ephemeral locations in a VU. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
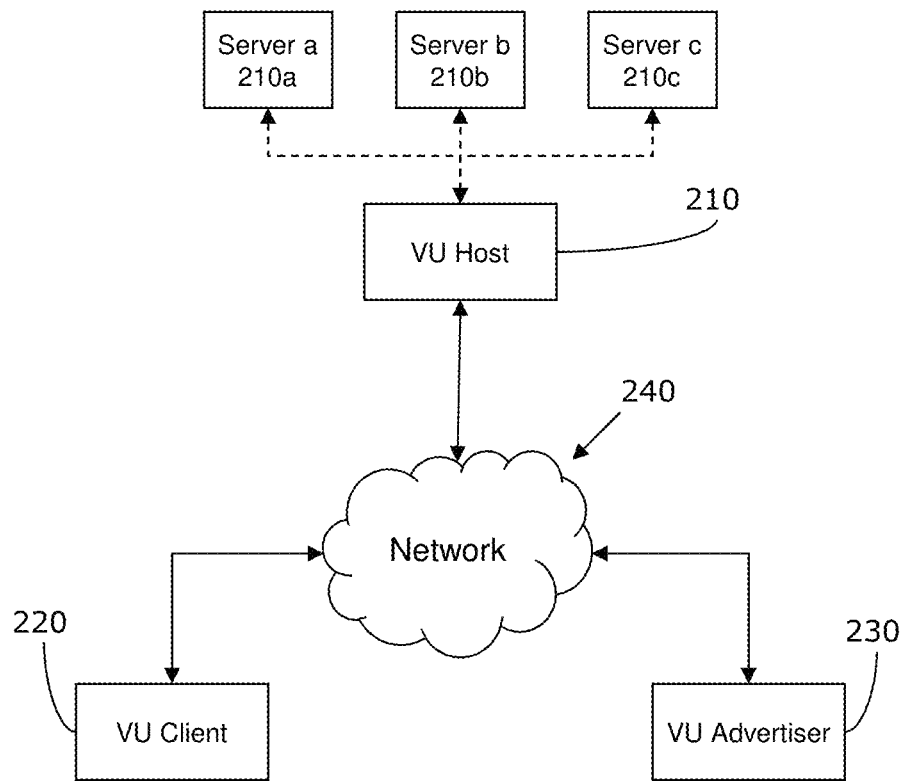
FIG. 2 shows an exemplary system according to aspects of the invention.

FIG. 2 shows an exemplary system according to aspects of the invention. In embodiments, a host 210 is operatively connected to at least one client 220 and at least one advertiser 230 via a network 240. The host 210 may comprise at least one computing device, such as that described with respect to FIG. 1, which operates the engine of a VU. For example, the host 210 may comprise a plurality of servers 210a, 210b, 210c and databases (such as, for example, 22B) that store data and provide the simulation engine(s) of a VU. As is known in the art such that further explanation is not believed necessary, each server 210a, 210b, 210c may be responsible for operating the VU engine to define a portion of the VU grid. Although three servers 210a, 210b, 210c are shown, the invention is not limited to this number, and any desired number of servers may be used within the scope of the invention. Moreover, the network 240 may comprise any suitable communication network, such as, for example, the Internet.

In embodiments, the client 220 comprises a computing device, such as, for example, a general purpose computing device comprising at least a processor, memory, I/O interface, and I/O device. Such computing devices are known in the art, such that further explanation is not believed necessary. In embodiments, the client 220 operates a client program of the VU. The client 220 allows a human user to create a persona for use in the VU. For example, the persona may take the form of an avatar that is moveable throughout portions of the VU. Additionally, a profile of attributes of the user may be associated with the avatar. The profile may contain user-entered data regarding any suitable attributes of the user, such as, for example: age, gender, address, country of citizenship, occupation, hobbies, interests, etc. The profile data may be stored at the client 220 or at the host 210 (e.g., in a database, not shown). Moreover, there may be any suitable number of clients 220 interacting with the host 210.

Still referring to FIG. 2, in embodiments the advertiser 230 comprises a computing device, such as that described with respect to FIG. 1. Like the client 220, the advertiser 230 runs a client program of the VU. In embodiments, the advertiser 230 provides at least one immersive advertisement in the VU (referred to herein as a VU-ad). For example, the advertiser 230 may be used to create a script (e.g., program) that defines a VU-ad, and the program may be uploaded to the host 210. The VU-ad, whether run from the advertiser 230 or the host 210, may be controlled by a stored script (e.g., program), a human user, or a combination of both. The VU-ad may comprise any desired content that is perceptible by other users of the VU (via clients 220), which at least one user of the VU may watch, interact with, and/or become immersed in the VU. When the VU-ad is at least partially controlled by a script, portions of the script may be stored at the advertiser 230 and/or at the host 210 (e.g., in a database, not shown).

In accordance with aspects of the invention, the VU-ad may take any suitable form. For example, the VU-ad may comprise, but is not limited to, any desired combination of: a pop-up graphic and/or text message that is displayed to the user, a graphic and/or text message displayed on a billboard (or other object) in the VU, a pop-up window that displays an animation and/or video to the user, an animation, video, or machinima displayed on a billboard (or other object) in the VU, a collection of ad objects and/or ad avatars in the VU that the user avatar is permitted to interact with, etc. Any or all of these examples may include audible components that are also transmitted to the user. Moreover, any or all of these examples may further include the option of a human operator interacting with the user via, e.g., VOIP, text message, etc.

The VU-ad may be triggered (e.g., initiated) in any suitable manner. For example, triggers used in embodiments of the invention include, but are not limited to: a user moving (e.g., walking, flying, etc.) his or her avatar over a designated location in the VU, a user moving his or her avatar into contact with an object (e.g., billboard) in the VU, a user moving his or her avatar into contact with an object displaying a commercial (e.g., animation, video, machinima, etc.) in the VU, a user mouse-clicking on an object in the VU, a user communicating (e.g., via, VOIP, text message, etc.) a particular phrase in the VU, a user selecting an option from a menu, etc. In any of these examples, a user may knowingly trigger the VU-ad (e.g., by choosing a menu option), or may unknowingly trigger the VU-ad (e.g., by walking through a door). There is no requirement that the user want (e.g., intend to) trigger the VU-ad. Moreover, a VU-ad may have one or several such triggers. In embodiments, the triggers are defined in the script of the VU-ad.

Figure 3:
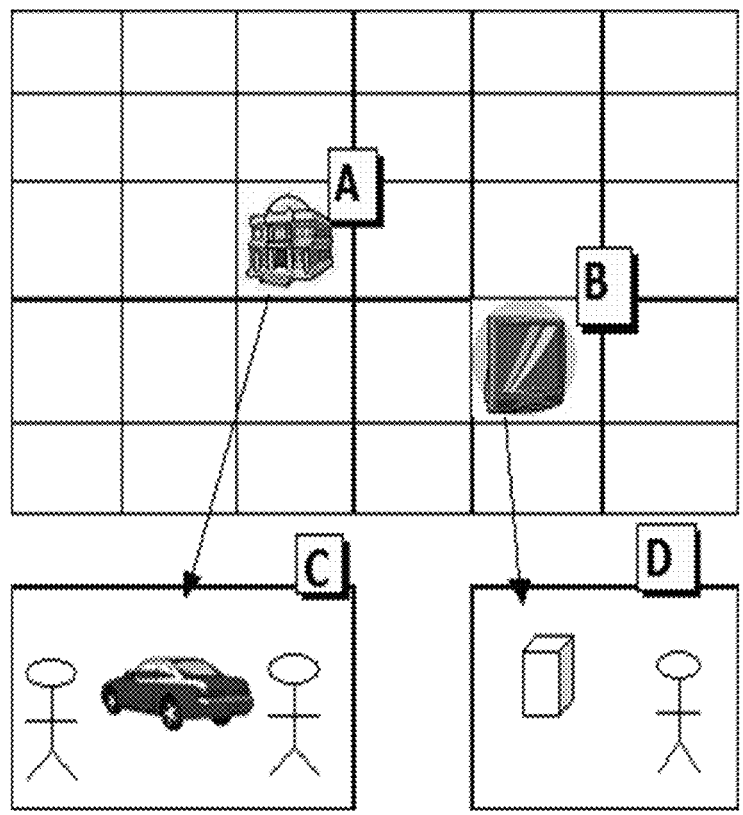
FIG. 3 shows a relation between ephemeral locations and static grid locations according to aspects of the invention.

In implementations of the invention, an ephemeral location is created and managed when a user triggers a VU-ad. FIG. 3 illustrates the creation of an ephemeral location in a VU. By using ephemeral locations, a small parcel of real estate on the VU grid (shown as A and B) can be linked to a larger area (shown as C and D). Areas C and D are ephemeral, only being rendered on-demand when needed, and disappearing when not needed. For example, when a user causes his or her avatar to move (e.g., walk or fly) into the doorway of the building depicted at grid location A, the ephemeral location C (which may be much large in area than location A) is created and the user's avatar is automatically teleported to ephemeral location C. Similarly, a television screen may be displaying a portion of an advertisement at grid location B. When a user causes his or her avatar to touch the television screen, ephemeral location D is created (e.g., rendered) and the user's avatar is teleported to ephemeral location D. The use of ephemeral locations provides, amongst other benefits, a conservation of VU land space and processing power.

To facilitate creation and management of ephemeral locations, embodiments of the invention comprise an ephemeral location manager (manager). More specifically, the manager may comprise or be embodied in a software application, such as program control 44 described above with respect to FIG. 1. At least a portion of the manager may reside on at least one of the host 210 and advertiser 230. For example, a main portion of the manager may reside at the host 210, and agents of the manager may reside at each advertiser 230. Alternatively, the entirety of the manager application may be stored at the host 210. The manager communicates with at least one of the host 210, client 220, and advertiser 230 to operate as described below.

In embodiments, the manager operates to create an ephemeral location when a VU-ad is triggered in the above-described manner. The creation may include, for example, rendering of the ephemeral location based upon ephemeral location characteristics (e.g., ad objects, ad avatars, etc.) stored in the VU-ad. For example, the manager may communicate with at least one of the servers 210a, 210b, 210c and the advertiser 230 to temporarily create an area in the VU based upon definitions stored at the advertiser 230 and/or host 210.

In further embodiments, the manager operates to create a mapping between the VU static grid and the ephemeral location. For example, the manager may create a link between a grid location (e.g., SECOND LIFE URL,) where the VU-ad was triggered and the ephemeral location. In this manner, the manager can further operate to teleport the user avatar from the grid location to the ephemeral location, permit the user avatar to interact with the VU-ad at the ephemeral location, and then teleport the user avatar from the ephemeral location back to the grid location where the VU-ad was triggered. Teleporting between defined locations in a VU is known, such that further explanation is not believed necessary.

In even further embodiments, the manager operates to manage the ephemeral location while the user is interacting with the VU-ad in the ephemeral location. Such interaction may include, for example, communication between at least one of the manager, the VU-engine, a program that defines the VU-ad, and the client program cooperating to permit the user to: move his/her avatar around in the area defined by the ephemeral location, observe ad-objects and/or ad-avatars in the ephemeral location, communicate with aspects of the VU-ad in the ephemeral location (e.g., read text of the VU-ad, listen to pre-recorded messages of the VU-ad, chat with ad avatar bots, chat with human operators of the ad, etc.), alter features of the VU-ad that have been tagged for alteration (e.g., move an ad avatar and/or ad object out of the way, delete an ad avatar and/or ad object, change the visual appearance of an ad avatar and/or ad object, assume the identity of an actor avatar in a scene, etc.). While such interaction is occurring, the manager may operate to render and un-render aspects of the ephemeral location as necessitated by the actions of the user.

In additional embodiments, the manager provides resource management for the VU system. For example, when a VU-ad is triggered, the manager may communicate with the servers 210a, 210b, 210c to determine which server is best suited to handle rendering of the ephemeral location. More specifically, the manager may determine current load state (e.g., processing power availability) of each server, and instruct the server that is least loaded to handle the ephemeral location. That is to say, if servers 210a and 210b are operating at near full capacity while server 210c has extra bandwidth, then the manager may instruct server 210c to render the current ephemeral location. In this manner, the manager provides load balancing for the host 210 of the VU system.

Moreover, in further embodiments, the manager manages multiple ephemeral locations simultaneously by creating a state table that defines all of the ephemeral locations currently in use. For example, such a state table may include information pertaining to, but not limited to: an identity of ephemeral locations that are currently rendered; the server associated with the rendering of each ephemeral location; the user(s) associated with each ephemeral location; the VU-ad and/or advertiser associated with the ephemeral location; the mapping between the VU grid and each ephemeral location. In this manner, the manager manages multiple simultaneous, customized instances of ephemeral locations for different users.

Also, in embodiments, the manager may operate to provide compensation associated with the ephemeral location. For example, the manager may communicate with the host to determine the amount of processing time and processing power that was required to render the ephemeral location, and charge an appropriate amount to the advertiser for receiving such benefit. Additionally or alternatively, the manager (acting as a Service Provider or being associated with a Service Provider) may determine a fee to be paid to the land owner from which the ephemeral location was triggered. Such fees may be based upon any suitable criteria and, once determined, communicated by the manager to the appropriate parties (e.g., the payer and the payee).

Processes

The steps of the flow diagrams described herein may be implemented in the environment of FIGS. 1 and/or 2. The flow diagrams may equally represent a high-level block diagram of the invention. The steps of the flow diagrams may be implemented and executed from a server, in a client-server relationship, by computing devices in an ad hoc network, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environments of FIGS. 1 and/or 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
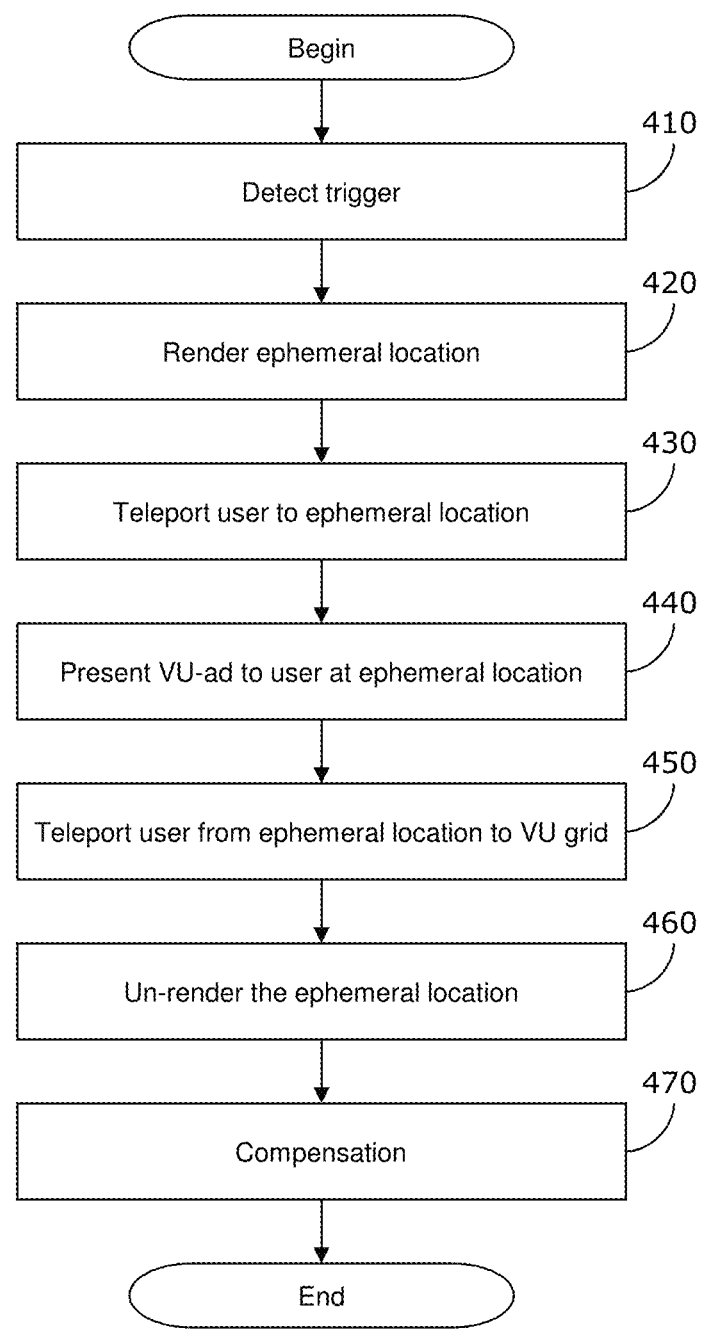
FIG. 4 shows a flow diagram depicting implementations of a method according to aspects of the invention.

FIG. 4 shows a flow diagram depicting steps of an embodiment for creating and managing ephemeral locations according to aspects of the invention. At step 410, a user is permitted to trigger the creation of an ephemeral location, and this trigger is detected (for example, by the ephemeral location manager as described above with respect to FIG. 2). This triggering may be accomplished as described above, and may include, for example: a user moving (e.g., walking, flying, etc.) his or her avatar over a designated location in the VU, a user moving his or her avatar into contact with an object (e.g., billboard) in the VU, a user moving his or her avatar into contact with an object displaying a commercial (e.g., animation, video, machinima, etc.) in the VU, a user mouse-clicking on an object in the VU, a user communicating (e.g., via, VOIP, text message, etc.) a particular phrase in the VU, a user selecting an option from a menu, etc. In embodiments, the manager detects the trigger by communicating (e.g., sending/receiving data to/from) with at least one of the host, client, and advertiser computing devices as described above with respect to FIG. 2.

At step 420, the ephemeral location is rendered. In embodiments, the manager accesses a definition of the ephemeral location that is stored as part of the VU-ad program stored at either the advertiser 230 and/or host 210. For example, the definition of the ephemeral location may include, but is not limited to, information regarding the dimensions of the ephemeral location area, objects present in the ephemeral location, avatars present in the ephemeral location, etc. The manager creates (or causes a server 2101, 210b, 210c) to create the ephemeral location according to the definition.

In embodiments, step 420 additionally includes establishing a mapping between the VU grid and the ephemeral location. For example, the manager communicates (e.g., sends/receives data to/from) with at least one of the host, client, and advertiser to define a link from the location of the VU grid where the triggering occurred and the VU.

In further embodiments, step 420 includes determining which server to task with rendering the ephemeral location. For example, the manager may survey the available servers (e.g., 210a, 210b, 210c), and assign the task of rendering the ephemeral location based upon load balancing principles.

Additionally, step 420 may include updating a state table regarding information associated with the newly created ephemeral location. For example, the manager may store, at any suitable storage location (e.g., storage 22B), information regarding, but not limited to: the identity of the ephemeral location; the server associated with creating the ephemeral location; the mapping between the ephemeral location and VU grid; and the user(s) and/or advertiser(s) associated with the ephemeral location.

At step 430, the user that triggered the ephemeral location is teleported to the ephemeral location. For example, using the mapping determined at step 420, the user avatar may be seamlessly transported from the VU grid to the ephemeral location. Teleporting is known, such that further explanation is not believed necessary.

At step 440, the ephemeral location is managed while the user interacts with the aspects of the ephemeral location. In embodiments, the manager operates to render and un-render aspects of the ephemeral location as necessitated by the actions of the user. This may be accomplished, for example, by the manager sending/receiving appropriate data to/from at least one of the host, client, and advertiser. Additionally, the manager may update the state table to reflect any alterations to the ephemeral location.

At step 450, when the user is through interacting in the ephemeral location, the user is teleported back to the VU grid. In embodiments, the manager communicates with at least the host and client to teleport the user back to the VU grid according to the mapping determined in step 420.

At step 460, the ephemeral location is un-rendered. In embodiments, the manager communicates with at least one of the host and advertiser to un-render the ephemeral location that was created in step 420, such that the ephemeral location disappears. Also, the manager may appropriately update the state table to indicate that the ephemeral location has been un-rendered.

Optionally, at step 470, compensation is provided for use of the ephemeral location. For example, the manager may determine the time and/or processing power spent by the host to render the ephemeral location, and bill an appropriate amount based upon such determination to the advertiser. Additionally or alternatively, the manager may facilitate compensation of the land owner of the grid location that the ephemeral location was triggered from.

Moreover, at least one of the steps of FIG. 4 may be performed on a computer infrastructure that is at least one of created, maintained, deployed, and supported by a service provider. In return for providing such a computer infrastructure, the service provider may receive payment from at least one of a VU user, VU advertising entity, and VU host. Furthermore, implementations of the invention are not limited to the examples described herein. Rather, any suitable values and measurements are also contemplated by the invention using the flow diagrams described herein.

While the invention has been described in terms of embodiments, those skilled in the art will recognize that the invention can be practiced with modifications and in the spirit and scope of the appended claims.

What is claimed:

1. A system for advertising in a virtual universe (VU), comprising causing a computer infrastructure to:
   render an ephemeral location in the VU by creating a mapping between a VU grid of the VU and the ephemeral location;
   transport a user avatar from the VU grid to the ephemeral location;
   present a VU-ad to the user at the ephemeral location;
   transport the user avatar from the ephemeral location back to the VU grid; and
   un-render the ephemeral location to cause the ephemeral location to disappear from the VU.

2. The system of claim 1, wherein the rendering further comprises:
   assigning creation of the ephemeral location to one of a plurality of servers based upon a determined availability of each of the plurality of servers.

3. The system of claim 2, wherein the assigning and creating are performed by a manager application stored at a host of the VU.

4. The system of claim 3, wherein the ephemeral location in the VU is rendered upon a triggering in the VU.

5. The system of claim 3, further comprising causing the computer infrastructure to permit the user avatar to interact in the ephemeral location.

6. The system of claim 3, further comprising causing the computer infrastructure to determine an amount of compensation based upon at least one of time and processing power utilized during the rendering.

7. The system of claim 3, wherein the manager renders and un-renders aspects of the ephemeral location based upon actions of the user.

8. The system of claim 1, wherein the ephemeral location and the VU grid location are different locations in the VU.

9. The system of claim 2, wherein the rendering further comprises:
   saving data associated with the ephemeral location to a state table.

10. The system of claim 9, wherein the state table includes information defining:
    an identity of the ephemeral location that is currently rendered;
    the one of the plurality of servers associated with the rendering of the ephemeral location;
    the user associated with the ephemeral location; and
    the VU-ad associated with the ephemeral location; and the mapping between the VU grid location and the ephemeral location.

11. The system of claim 9, wherein the rendering further comprises:
    providing compensation associated with the ephemeral location including determining an amount of processing time and processing power required to render the ephemeral location, and charging an amount to an advertiser associated with the VU-ad based on the determining.

12. The system of claim 9, wherein the saving is performed by a manager application stored at a host of the VU.

* * * * *